June 13, 1933.  C. W. COSEBOOM  1,914,079
YIELDING SUPPORT FOR AUTOMOBILE ENGINES
Filed Feb. 29, 1932
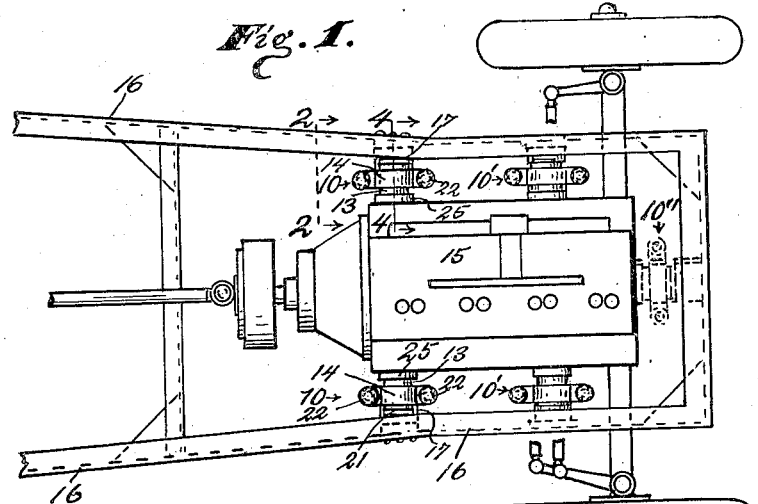
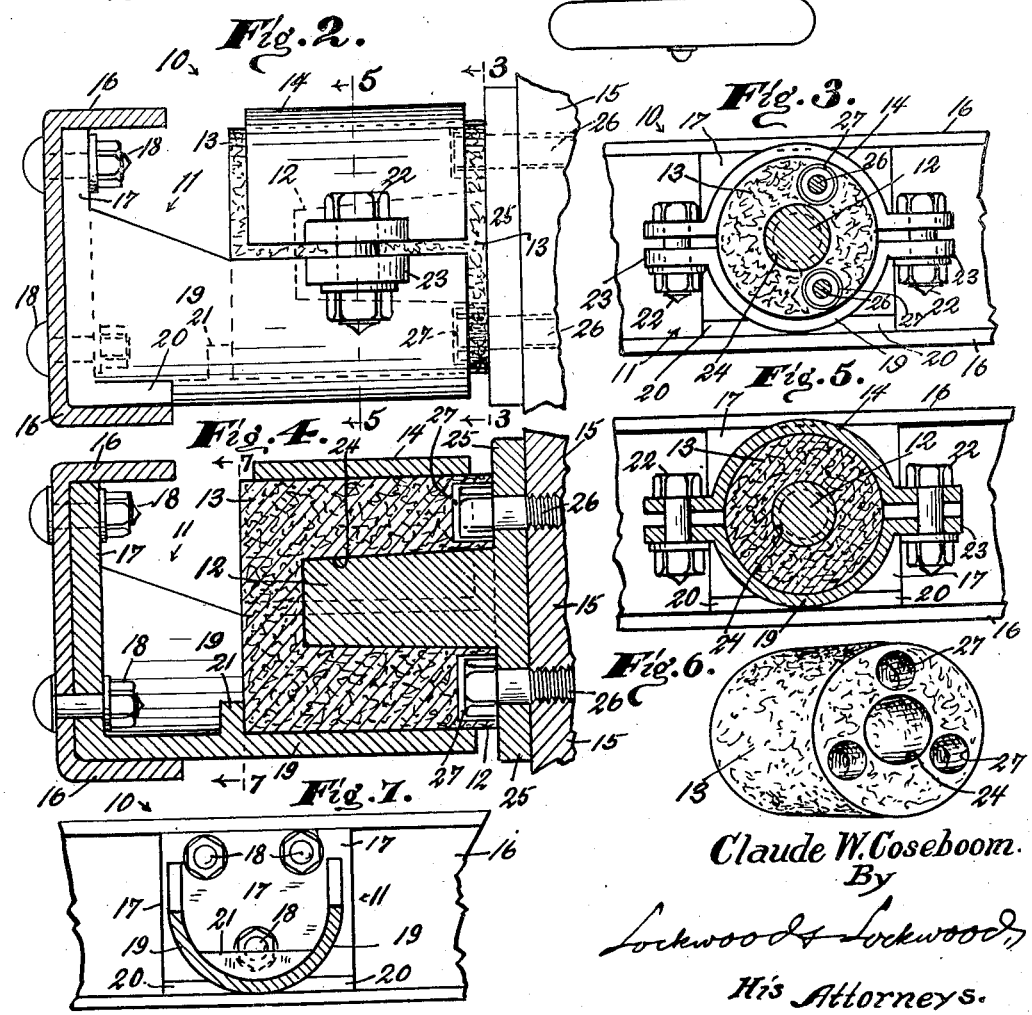
Claude W. Coseboom.
By
Lockwood & Lockwood,
His Attorneys.

Patented June 13, 1933

1,914,079

UNITED STATES PATENT OFFICE

CLAUDE W. COSEBOOM, OF LOS ANGELES, CALIFORNIA, ASSIGNOR OF ONE-HALF TO KIRK WHITE, OF LOS ANGELES, CALIFORNIA

YIELDING SUPPORT FOR AUTOMOBILE ENGINES

Application filed February 29, 1932. Serial No. 595,834.

This invention relates to means for yieldingly mounting an automobile engine on its frame and the principal object thereof is to provide a simple means which in addition to forming a universal yielding connection between the engine and its frame also functions as a sound interrupter that prevents the humming sound from the engine while in action from being transmitted to the support where the noise is usually amplified much to the annoyance of persons near the engine.

Another object is to provide a relatively strong yielding connection between the engine and support that is simple to make and install and which in use can yield slightly in any direction without danger of being disconnected by excessive shock or vibration. To that end I provide relatively strong brackets that can be oppositely arranged and very rigidly secured to the frame with seats on their inner ends for cylindrical rubber cushions with transverse ribs for limiting the movement of the cushions toward the frame. The cushions are provided with tapered sockets into which tapered hubs are loosely and slidably fitted with the hubs secured to the sides of the engine so the latter can have a slight universal movement. Also the hubs and tapered sockets in the cushions are arranged so that when the vibration of the engine or shock of travel causes it to move sidewise the hubs on one side of the engine will loosen in their sockets and the other hubs will correspondingly tighten.

Another object of the invention is to provide simple means for mounting an engine on a frame so it will be at all points out of metal contact and in floating suspension on the frame, and with the supporting means constructed to yieldingly resist independent movement of the engine and frame relative to each other in every direction.

A feature of invention is shown in the means for seating the sound and vibration insulating cushion.

Other objects, advantages and features of invention may appear from the accompanying drawing, the subjoined detailed description and appended claims.

The accompanying drawing illustrates the invention, in which:

Figure 1 is a fragmental plan view of an automobile frame showing an internal combustion engine connected to the frame by cushion supports having cylindrical blocks therein that are constructed in accordance with this invention, parts indicated semidiagrammatically. Fig. 2 is an enlarged fragmental cross section through one side of the automobile frame showing a side view of one of my cushion supports connecting one side of an engine to the frame. Fig. 3 is a section on line 3—3 of Fig. 2 on a slightly smaller scale. Fig. 4 is an enlarged fragmental section on line 4—4, Fig. 1, showing the detailed construction of one of my cushion supports, parts drawn to the same scale as those shown in Fig. 2; also showing that the engine is supported entirely out of metal contact with the frame. Fig. 5 is a section on line 5—5, Fig. 2, with parts drawn to the same scale as Fig. 3. Fig. 6 is a perspective view of the resilient sound and vibration interrupting cylindrical rubber block used in my engine support showing the end socket for receiving the hub of the support and also the recesses for receiving the bolt heads that secure the hub base plate to the engine. Fig. 7 is a section on line 7—7, Fig. 4, on a slightly smaller scale showing the concave block seat for the sound interrupter rubber block.

In detail the engine support 10 includes a bracket 11, hub 12, cylindrical rubber block 13 and strap 14 that are constructed, assembled, installed and used as illustrated in the accompanying drawing, and is made in various sizes suitable for supporting any size or make of engine, whether it is used in an automobile, boat or airplane frame. Also the engine support can be used in sets of two, three, four or more.

As illustrated by full lines in Fig. 1, the engine 15 is supported on the frame 16 by four of these cushion supports 10 and 10', and also as indicated by dotted lines an engine support 10'' can be placed centrally in front of the engine to take the place of the front side supports 10' so the engine will be supported at three places instead of four, as shown by full lines.

The cushion supports are all constructed substantially alike except as to size so that a description of one will describe all of them. The bracket 11 includes an end plate 17 that extends inside the channel iron of the frame 16 and is secured thereto by the bolts 18, preferably three in number as shown in Fig. 7.

Integral with the end plate 17 and extended at right angles thereto is a concave block plate 19 that at its outer end has oppositely extending lugs 20 that rest on the lower flange of the channel iron of frame 16 to reinforce the bracket and aid in holding it in fixed position in the frame.

A stop rib 21 extends transversely across the inside of the concave block seat 19 and is integral therewith and arranged to limit the outward movement of the cylindrical rubber block 13 that is seated in the end of the transversely concave block seat and secured thereon by the strap 14 that is secured by bolts 22 to the oppositely extending clamp lugs 23 that are integral with the block seat 19.

The tapered hub 12 is adapted to be fitted snugly into a socket 24 extended centrally into an end of the rubber cushion 13, and the hub is provided with an integral base plate 25 that is adapted to be secured by bolt 26 to a side of the engine 15, and the rubber cushion 13 is recessed at 27 to form clearances for the heads of the bolts 26. The rubber block 13 is extended over the inner end of the concave block seat 19 to aid in holding the engine 15 entirely out of metal contact with the bracket 11; and also to add resiliency to the connection between the engine and frame. It is understood that there can be two or more of the bolts 26 or a number sufficient to safely support the weight of the engine under all operating conditions. The outer end portion of the cylindrical rubber block 13 is solid as best shown in Fig. 4, and the outer end of the hub 12 engages this solid end portion centrally so that when there is a side thrust to the engine the force thereof will be applied both to the inner end of the block and on its solid end portion.

Preferably I employ four of my engine supports for each engine arranged adjacent the four corners to distribute the weight equally between them, as shown by full lines in Fig. 1, but it is understood that with very light weight engines I may employ only three supports, as previously indicated, and with heavy engines I can employ as many as are necessary.

In operation the parts of the engine supports are assembled and installed as shown and described and when so attached to the engine and frame form a floating suspension of the engine, and permit a yielding resisting movement between the frame and engine that is universal relative to the direction in which it is imparted, and this yielding resistance prevents injury or excessive shock or vibrational wear to the engine and frame or to their connecting supports. That is, the engine and frame while being very securely connected by my supports are held entirely out of metal contact by the cylindrical rubber blocks interposed between them, and the blocks are made exceptionally large relative to the other parts of the supports so the engine can have considerable play by the yielding of the blocks when it is subjected to heavy shock incident to automobile travel.

I claim as my invention:

1. A yielding support for an engine including a frame, a bracket secured to said frame, a concave seat extended inwardly from said frame, a cylindrical rubber block on said seat having a compact outer end portion and a tapered socket extending inwardly from its inner end, an engine, a tapered hub secured to the side of said engine and loosely fitted into the socket of said rubber block, and a strap for securing said block to said seat, said rubber block having its socket end extended inwardly beyond the inner end of said concave seat to hold said engine out of metal contact with said bracket and frame.

2. A yielding support for an engine including a frame, channel irons thereon, an engine arranged between said irons, brackets secured to said irons, concave block seats integral with said brackets and extended inwardly toward said engine, stops adjacent the outer ends of said seats, cylindrical rubber blocks on said seats having tapered sockets extending inwardly from the inner ends of said blocks and the solid outer ends of said blocks engaging said stops, tapered hubs secured to the sides of said engine and loosely extended into the sockets of said blocks, and straps for securing said blocks in said seats, said blocks extending over the inner ends of said seats and other parts arranged to hold said engine out of metal contact with said bracket and frame and permit universal movement on said yielding supports to compensate for shocks incident to automobile travel.

In witness whereof I have hereunto affixed my signature.

CLAUDE W. COSEBOOM.